(12) United States Patent
Fitch et al.

(10) Patent No.: US 7,727,395 B2
(45) Date of Patent: Jun. 1, 2010

(54) METHOD AND APPARATUS FOR PROCESSING ORGANIC WASTE

(75) Inventors: Eric E. Fitch, Arlington, MA (US);
David M. O'Keefe, Gainesville, FL (US); David C. Palmer, Franklin, TN (US)

(73) Assignee: PurposeEnergy, Inc., Arlington, MA (US)

(*) Notice: Subject to any disclaimer, the term of this patent is extended or adjusted under 35 U.S.C. 154(b) by 191 days.

(21) Appl. No.: 12/178,292

(22) Filed: Jul. 23, 2008

(65) Prior Publication Data

US 2010/0018917 A1    Jan. 28, 2010

(51) Int. Cl.
*C02F 3/28* (2006.01)
*C05F 5/00* (2006.01)
*C05F 11/00* (2006.01)

(52) U.S. Cl. .................. 210/603; 210/617; 210/259; 210/260; 71/10; 71/26

(58) Field of Classification Search .................. 210/603, 210/615–617, 252, 259, 260; 71/10, 26
See application file for complete search history.

(56) References Cited

U.S. PATENT DOCUMENTS

| | | | |
|---|---|---|---|
| 2,430,519 A | 11/1947 | Mallory | |
| 4,022,665 A | 5/1977 | Ghosh et al. | 195/27 |
| 4,323,367 A | 4/1982 | Ghosh | 48/197 |
| 4,396,402 A | 8/1983 | Ghosh | 48/197 |
| 4,568,457 A | 2/1986 | Sullivan | 210/151 |
| 4,696,746 A | 9/1987 | Ghosh et al. | 210/603 |
| 5,143,618 A | 9/1992 | Hyun et al. | 210/615 |
| 5,269,634 A | 12/1993 | Chynoweth et al. | 405/303 |
| 5,525,229 A | 6/1996 | Shih | 210/603 |
| 5,885,460 A * | 3/1999 | Dague et al. | 210/605 |
| 6,342,378 B1 | 1/2002 | Zhang et al. | 435/168 |
| 6,811,701 B2 * | 11/2004 | Wilkie | 210/603 |
| 6,982,035 B1 | 1/2006 | O'Keefe | 210/258 |
| 7,033,822 B2 | 4/2006 | Maston | 435/290.1 |
| 2003/0033430 A1 | 2/2003 | Lau et al. | 709/245 |
| 2003/0075501 A1* | 4/2003 | Wilkie | 210/615 |
| 2005/0040107 A1 | 2/2005 | Kasparian et al. | 210/636 |

FOREIGN PATENT DOCUMENTS

| | | |
|---|---|---|
| EP | 0 318 098 | 5/1989 |
| EP | 0 791 561 A2 | 8/1997 |

OTHER PUBLICATIONS

R. Moletta, "Winery and distillery wastewater treatment by anaerobic digestion," *Water Science and Technology*, vol. 51(1) (2005), pp. 137-144.

* cited by examiner

*Primary Examiner*—Fred Prince
(74) *Attorney, Agent, or Firm*—Pierce Atwood LLP (57) ABSTRACT

A method for processing brewery waste that includes receiving spent grain, low strength wastewater and high strength wastewater. The spent grain, low strength wastewater and high strength wastewater is processed with a plug flow anaerobic digester to produce a first output. A portion of the first output is processed with an upflow anaerobic sludge blanket digester to produce a second output. A portion of the second output is processed with a fixed-film anaerobic digester to produce a third output.

21 Claims, 4 Drawing Sheets

METHOD AND APPARATUS FOR PROCESSING ORGANIC WASTE

FIELD OF THE INVENTION

The present invention relates to methods and apparatus for processing organic waste. More particularly, the present invention relates to methods and apparatus for processing brewery waste.

BACKGROUND OF THE INVENTION

Anaerobic digestion is a method used for converting industrial or municipal organic byproducts or substrates into clean and renewable energy in which microorganisms are used to break down biodegradable materials in the absence of oxygen. It is commonly used to treat wastewater and organic waste. Anaerobic digestion produces gases (e.g., methane) and nutrient-rich solids which can be recovered and used. Accordingly, the byproducts of anaerobic digestion are a renewable energy source that can be used, for example, in place of fossil fuels. In addition, the nutrient-rich solids that are a byproduct of the digestion process can be used for soil amendment (e.g., fertilizer).

Commercial anaerobic digesters used at breweries typically do not digest spent grain or high strength wastewater. Digesters used at breweries are limited in application to waste that is substantially liquid with chemical oxygen demand ("COD") levels of about 5,000 ppm. Spent grain and high strength wastewater are typically hauled offsite and used as a feed supplement for hogs and cattle. This limits the renewable energy production to about 5% of the potential renewable energy production that would be achieved if the high strength wastewater and spent grain were also efficiently anaerobically digested.

A need therefore exists for improved systems and methods for processing organic waste, and in particular, brewery waste.

SUMMARY OF THE INVENTION

Digesters have previously been used at breweries, but none have effectively digested spent grain and high strength wastewater (e.g., wastewater having COD levels significantly greater than about 5,000 ppm. A COD test is commonly used to indirectly measure the amount of organic compounds in a material (e.g., water). A COD value is a measure of the amount of oxygen consumed per liter of material when oxidized by chemical processes (expressed in parts per million (ppm) or alternatively milligrams per liter (mg/L)).

The invention, in one aspect, features a method for processing brewery waste. The method includes receiving spent grain, low strength wastewater and high strength wastewater. The method also includes processing the spent grain, low strength wastewater and high strength wastewater with a plug flow anaerobic digester to produce a first output. The method also includes processing a portion of the first output with an upflow anaerobic sludge blanket digester to produce a second output. The method includes processing a portion of the second output with a fixed-film anaerobic digester to produce a third output.

In some embodiments, the method includes mixing the spent grain, low strength wastewater and high strength wastewater prior to providing the spent grain, low strength wastewater and high strength wastewater to the plug flow digester. The first output can include gases, liquids and solids. In some embodiments, liquids of the first output are the portion of the first output processed with the upflow anaerobic sludge blanket digester.

In some embodiments, the second output includes gases, liquids and solids. In some embodiments, liquids of the second output are the portion of the second output processed with the fixed-film anaerobic digester. In some embodiments, the third output includes gases, liquids and solids.

In some embodiments, the method includes recirculating a portion of liquids of the third output to the plug flow anaerobic digester. In some embodiments, the method includes treating liquids of the third output to produce a low oxygen demand liquid. In some embodiments, the method includes treating solids of the first and second outputs to produce a soil amendment material (e.g., fertilizer). In some embodiments, the method includes collecting gases of the first, second and third outputs. The collected gases can include methane. In some embodiments, a portion of the methane is burned in a boiler to provide heat to the plug flow anaerobic digester, upflow anaerobic sludge blanket digester and fixed-film anaerobic digester.

The invention, in another aspect, features a method for processing brewery waste. The method includes receiving spent grain, low strength wastewater and high strength wastewater. The method also includes processing the high strength wastewater with an upflow anaerobic sludge blanket digester to produce a first output. The method also includes processing a portion of the first output with a fixed-film anaerobic digester to produce a second output. The method also includes processing the spent grain and low strength wastewater with a plug flow anaerobic digester to produce a third output. The method also includes processing a portion of the third output with an upflow anaerobic sludge blanket digester to produce a fourth output. The method also includes processing a portion of the fourth output with a fixed-film anaerobic digester to produce a fifth output.

In some embodiments, the method includes treating liquids of at least one of the first, second, third, fourth or fifth outputs to produce a low oxygen demand liquid. In some embodiments, the method includes treating solids of at least one of the first, second, third, fourth or fifth outputs to produce a soil amendment material.

The invention, in another aspect, features a three-stage anaerobic digestion system for processing brewery waste. The system includes at least one inlet for receiving at least one of spent grain, low strength wastewater or high strength wastewater. The system also includes a plug flow anaerobic digester coupled to the at least one inlet for processing at least one of spent grain, low strength wastewater or high strength wastewater to produce a first output. The system also includes an upflow anaerobic sludge blanket digester coupled to an outlet of the plug flow digester for processing the first output to produce a second output. The system also includes a fixed-film anaerobic digester coupled to an outlet of the upflow anaerobic sludge blanket digester for processing the second output to produce a third output comprising solids, liquids and gases.

In some embodiments, the plug flow anaerobic digester, upflow anaerobic sludge blanket digester and fixed-film anaerobic digester are integrated into a single digester structure.

The invention, in another aspect, features a method for processing brewery waste. The method includes receiving spent grain, low strength wastewater and high strength wastewater. The method also includes processing the low strength wastewater and the high strength wastewater with an upflow anaerobic sludge blanket digester to produce a first output.

The method also includes processing a portion of the first output with a fixed-film anaerobic digester to produce a second output. The method also includes processing the spent grain with a plug flow anaerobic digester to produce a third output. The method also includes processing a portion of the third output with an upflow anaerobic sludge blanket digester to produce a fourth output. The method also includes processing a portion of the fourth output with a fixed-film anaerobic digester to produce a fifth output.

The invention, in another aspect, features a method for processing brewery waste. The method includes receiving spent grain, low strength wastewater and high strength wastewater. The method also includes processing the low strength wastewater with an upflow anaerobic sludge blanket digester to produce a first output. The method also includes processing a portion of the first output with a fixed-film anaerobic digester to produce a second output. The method also includes processing the spent grain and the high strength wastewater with a plug flow anaerobic digester to produce a third output. The method also includes processing a portion of the third output with an upflow anaerobic sludge blanket digester to produce a fourth output. The method also includes processing a portion of the fourth output with a fixed-film anaerobic digester to produce a fifth output.

The invention, in another aspect, features a method for processing organic waste. The method includes receiving organic waste solids, low strength wastewater and high strength wastewater. The method also includes processing the organic waste solids, low strength wastewater and high strength wastewater with a plug flow anaerobic digester to produce a first output. The method also includes processing a portion of the first output with an upflow anaerobic sludge blanket digester to produce a second output. The method also includes processing a portion of the second output with a fixed-film anaerobic digester to produce a third output.

BRIEF DESCRIPTION OF THE DRAWINGS

The foregoing and other objects, features and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
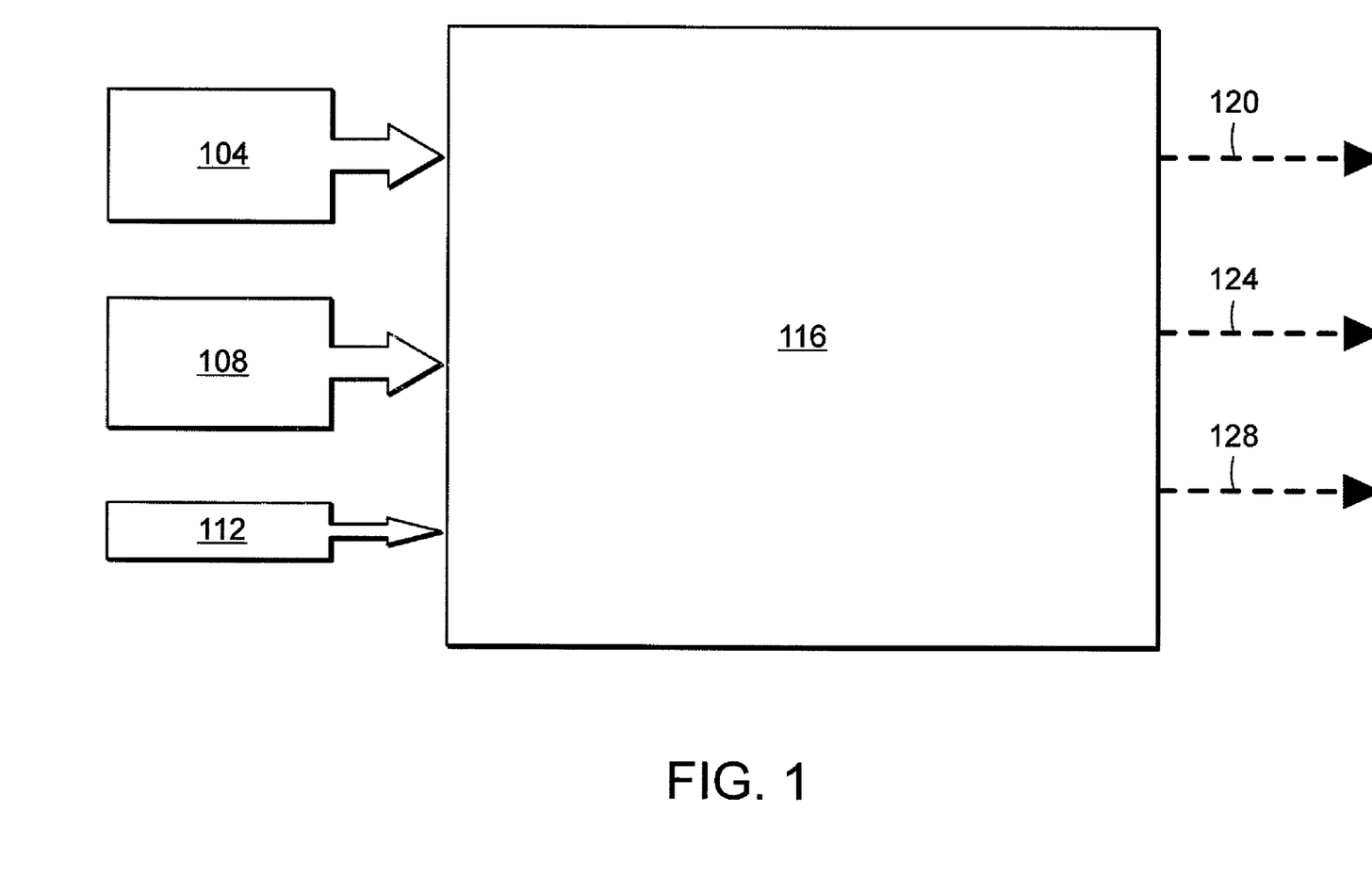
FIG. 1 is a schematic illustration of a system for processing organic waste, according to an illustrative embodiment of the invention.

FIG. 1 is a schematic illustration of an anaerobic digester system 116 for processing organic waste, according to an illustrative embodiment of the invention. High strength (high COD) wastewater 104, low strength (low COD) wastewater 108 and organic waste solids 112 (e.g., spent grain) are provided to the system 116. The high strength wastewater 104, low strength wastewater 108 and organic waste solids 112 are processed by the system 116 to produce gases 120, liquids 124 and solids 128. The gases 120 typically include a mixture of methane, carbon dioxide and some trace gases. The liquids 124 have reduced concentrations of organic compounds and are sometimes discharged for subsequent processing by a publicly owned treatment works. The solids 128 can be used as soil amendment materials. Soil amendment materials are materials that can be added to a soil as a nutrient (e.g., fertilizer) or to improve its physical properties (e.g., water retention, permeability, water infiltration, drainage, aeration and structure).

Any oxidizable material present in water (e.g., a natural waterway or in an industrial wastewater) will be oxidized both by biochemical (e.g., bacterial) or chemical processes. Since all natural waterways contain bacteria and nutrient, almost any waste compounds introduced into such waterways will initiate biochemical reactions. The biochemical reactions create what is measured as the Biochemical Oxygen Demand (BOD). Oxidizable chemicals introduced into a natural waterway will similarly initiate chemical reactions. The chemical reactions create what is measured as the Chemical Oxygen Demand (COD). Both the BOD and COD tests are a measure of the relative oxygen-depletion effect of a waste contaminant. The BOD test measures the oxygen demand of biodegradable pollutants and the COD test measures the oxygen demand of biogradable pollutants plus the oxygen demand of non-biodegradable oxidizable pollutants.

Figure 2:
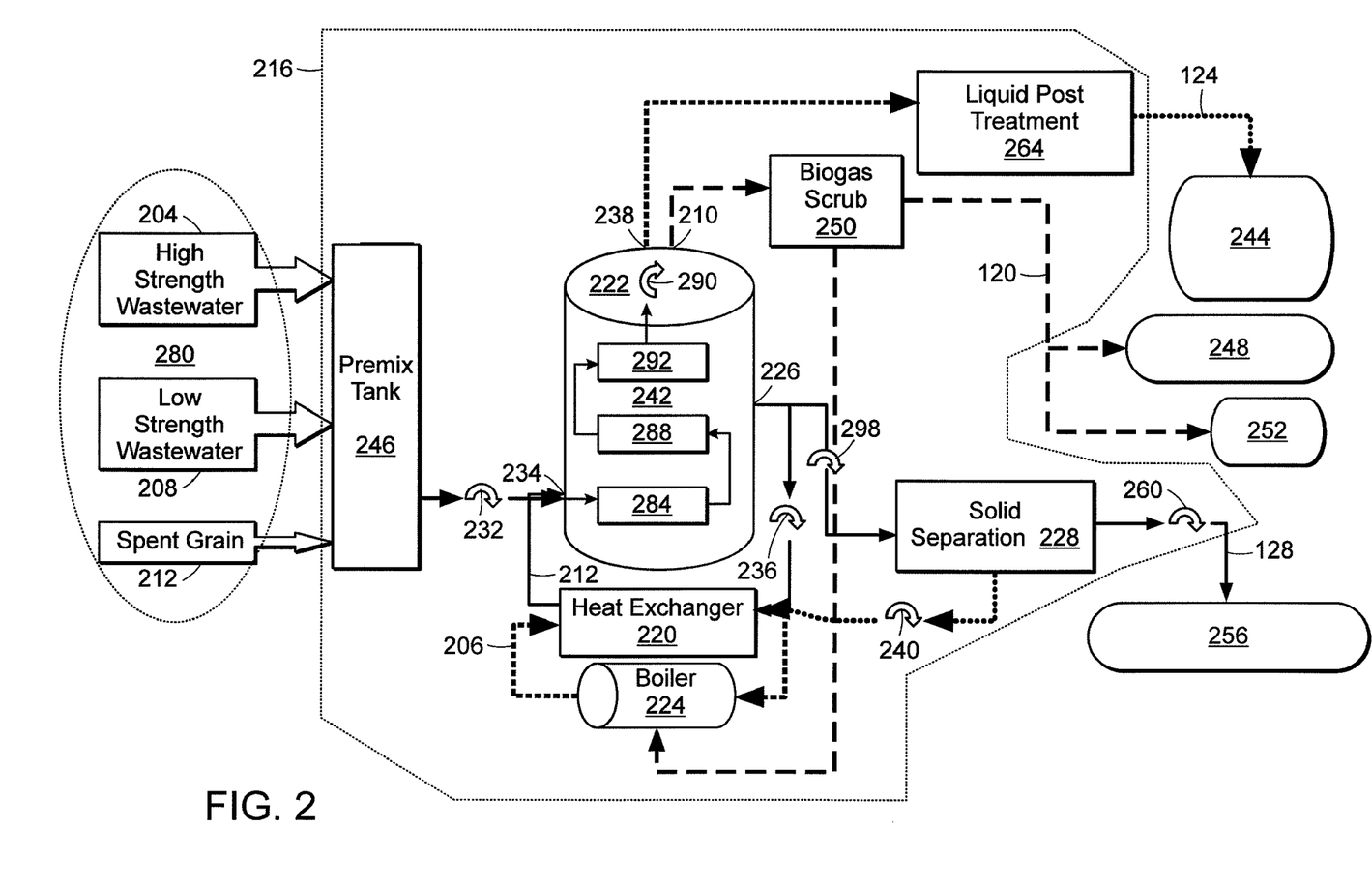
FIG. 2 is a schematic illustration of a system and method for processing brewery waste, according to an illustrative embodiment of the invention.

FIG. 2 is a schematic illustration of a system 216 and method for processing brewery waste, according to an illustrative embodiment of the invention. The brewery waste includes high strength wastewater 204, low strength wastewater 208 and spent grain 212 (collectively brewery waste 280). Spent brewer's grains are a byproduct of the beer brewing process and consist essentially of boiled malted barley and typically have a COD greater than about 100,000 ppm. Spent brewer's grains are typically 20-30% solids with the remainder being liquid (e.g., water). Low strength wastewater 208 is typically created on the bottling line and in the brew house when the equipment is cleaned and typically has a COD of about 5,000 ppm. High strength wastewater typically includes spent yeast and trub (i.e., sediment which is mostly dead or inactive yeast that collects in the bottom of a beer fermentation vessel which is produced during the fermentation process) and typically has a COD between about 50,000 ppm and about 100,000 ppm. Beer bottoms and spent beer are also often included with high strength wastewater.

The high strength wastewater 204, low strength wastewater 208 and spent grain 212 are provided to the system 216. The high strength wastewater 204, low strength wastewater 208 and spent grain 212 are mixed in a premix tank 246. The mixing in the premix tank 246 homogenizes the brewery waste 280 and transforms the brewery's batch process into a quasi-continuous process. The homogenized brewery waste (substrate) is pumped from the premix tank 246 to an inlet 234 of an anaerobic digester 242 using a pump 232. The pump rate is controlled using the amount of substrate in the premix tank as feedback to the pump speed. The pump speed may be increased as the premix tank 246 fills in order to prevent over filling of the premix tank 246. Similarly, the pump speed may be decreased as the premix tank 246 empties. At a certain level, the pump 232 shuts off. An example of the feedback algorithm used to control the operation of the pump 232 is a PID (proportional, integral, derivative) controller. Controlling the operation of the pump 232 results in a quasi-continuous process that is more continuous than the brewery's batch process.

In this embodiment, the anaerobic digester 242 is a three phase anaerobic digester. The anaerobic digester 242 vessel 222 houses a plug flow digester 284, an upflow anaerobic sludge blanket digester 288, and a fixed-film anaerobic digester 292. In this embodiment, the plug flow digester 284, an upflow anaerobic sludge blanket digester 288, and a fixed-film anaerobic digester 292 are all integrated together into a single digester structure (i.e., vessel 222). An outlet of the plug flow anaerobic digester 284 is coupled to an inlet of the upflow anaerobic sludge blanket digester 288 via, for example, a conduit, tube or other suitable structure. An outlet of the upflow anaerobic sludge blanket digester 288 is coupled to an inlet of the fixed-film anaerobic digester 292 via, for example, a conduit, tube or other suitable structure. In some embodiments, one or more of the separate digesters are housed in separate vessels and then coupled together.

In some embodiments, an output of the plug flow anaerobic digester 284 is output the anaerobic digester 242 vessel 222 via outlet 226 to the solids separation module 228 and the liquid portion of the output of the solids separation module 228 is provided to the inlet of the upflow anaerobic sludge blanket digester 288. In some embodiments, an output of the upflow anaerobic sludge blanket digester 288 is output from the anaerobic digester 242 vessel 222 via outlet 226 to the solids separation module 228 and the liquid portion of the output of the of the solids separation module 228 is provided to the inlet of the upflow anaerobic sludge blanket digester 288.

The substrate (mixture of high strength wastewater 204, low strength wastewater 208 and spent grain 212) is provided to the plug flow anaerobic digester 284. In a plug flow anaerobic digester, organic material is introduced at an inlet and the material flows by gravity towards the outlet. The substrate, and in particular high concentration insoluble solids, flow slowly through the plug flow anaerobic digester 284 where they are broken down into soluble acids. The plug flow anaerobic digester 284 outputs a combination of solids, liquids and gases. The gas portion of the plug flow anaerobic digester 284 output is initially stored in the headspace of the anaerobic digester 242 vessel for subsequent use and processing. The solids portion of the output of the plug flow anaerobic digester 284 is output from the anaerobic digester 242 vessel 22 via outlet 226 for additional processing or disposal. The liquid portion of the output of the plug flow anaerobic digester 284 (along with some suspended solids) are provided to the upflow anaerobic sludge blanket digester 288 for additional processing. In some embodiments, the plug flow anaerobic digester 284 is the portion of the digester described in U.S. Pat. No. 6,982,035 that includes, for example, the outer, high solids loop passage 12 (the entire contents of U.S. Pat. No. 6,982,035 are hereby incorporated by reference).

The upflow anaerobic sludge blanket digester 288 processes the liquids received from the plug flow anaerobic digester 284 to produce an output comprising a combination of solids, liquids and gases. In some embodiments, the upflow anaerobic sludge blanket digester 288 also receives liquids from the solids separation module 228 which are processed to produce an output comprising a combination of solids, liquids and gases. The upflow anaerobic sludge blanket digester 288 forms a blanket of granular sludge which is suspended in the digester 288. The liquid portion of the output of the plug flow anaerobic digester 284 flows upwards through the blanket and is processed (degraded) by the anaerobic bacteria located in the upflow anaerobic sludge blanket digester 288. The degradation process produces the solids, liquids and gases. The gas portion of the plug flow anaerobic digester 284 output is initially stored in the headspace of the anaerobic digester 242 vessel, with the gas produced in other steps of the process, for subsequent use and processing. The solids portion of the output of the upflow anaerobic sludge blanket digester 288 is output from the anaerobic digester 242 vessel 222 via outlet 226 for additional processing or disposal. In some embodiments, the additional processing (e.g., processing with the solids separation module 228) produces a liquid portion that is directed to the inlet of the upflow anaerobic sludge blanket digester 288. The liquid portion of the output of the upflow anaerobic sludge blanket digester 288 (along with some suspended solids) is provided to the fixed-film anaerobic digester 292 for additional processing.

The fixed-film anaerobic digester 292 processes the liquids received from the upflow anaerobic sludge blanket digester 288 to produce an output comprising a combination of solids, liquids and gases. The fixed film anaerobic digester 292 has a significant amount of media that creates surface area on which methogenic bacteria grow a biofilm. As the bacteria metabolize organic material, they produce a biofilm. As the biofilm grows, it detaches and settles to the bottom of the vessel 222. In addition to the biofilm that forms on the fixed film media, free floating bacteria that form in the vessel can settle forming a sludge blanket. In addition, biofilm that detaches from the fixed film media and settles will augment the sludge blanket. The formation of the sludge blanket forms the Upflow Anaerobic Sludge Blanket (UASB) component of the system. It is important to be able to control the volume of the sludge blanket because if too much of it accumulates it will clog the media and prevent additional biofilm from detaching. In one embodiment, the media is suspended above the bottom of the vessel 222 and the volume of the sludge blanket is controlled by pumping a portion of the sludge blanket out of the vessel 222 via outlet 226 to the solids separation module 228. In some embodiments, the fixed-film anaerobic digester 292 is the portion of the digester described in U.S. Pat. No. 6,982,035 that includes, for example, the inner, low solids chamber 13 (the entire contents of U.S. Pat. No. 6,982,035 are hereby incorporated by reference).

The gas portion of the fixed-film anaerobic digester 292 output is initially stored in the headspace of the anaerobic digester 242 vessel, with the gas produced in other steps of the process, for subsequent use and processing. The solids portion of the output of the fixed-film anaerobic digester 292 is output from the anaerobic digester 242 vessel 222 via outlet 226 for additional processing or disposal. A portion of the liquid portion of the output of the fixed-film anaerobic digester 292 is recirculated to the plug flow anaerobic digester 284.

Recirculating the liquid portion to the plug flow anaerobic digester 284 replenishes the bacteria used in the plug flow anaerobic digester 284. Another portion of the liquid portion of the output of the fixed-film anaerobic digester 292 is pumped out of outlet 238 of the vessel 222 with pump 290 to a liquid post treatment module 264. The rate of pumping is controlled with the volume of slurry in the anaerobic digester 242 as feedback (the volume of gas, organic fertilizer, and liquid effluent that is removed from the digester must be balanced with the volume of slurry that is added). The liquid post treatment module 264 processes the liquid and produces a liquid 124 that meets local discharge requirements.

In some embodiments, the liquid 124 is provided to a publicly owned treatment works 244. In some embodiments, the liquid 124 is land applied (e.g., for irrigation). In some embodiments, the liquid post treatment module 264 includes an aerobic basin that reduces the oxygen demand of the liquid. In some embodiments, the liquid post treatment module 264 includes a flocculation process that causes remaining suspended solids to aggregate or clump together so the solids can be filtered from the discharge. In some embodiments, buffer materials are added to the liquid post treatment module 264 to bring the pH of the liquid 124 within acceptable levels.

The gases output from the anaerobic digester 242 are provided to a biogas scrub module 250 via outlet 210. The gases are treated by a biogas scrubbing process. Moisture is removed from the gas. $H_2S$ may be removed. $CO_2$ may be removed. The exact scrubbing process depends on the final use of the biogas. If the gas is to be used for combustion in a boiler, minimal scrubbing is required. If the gas is to be delivered to a natural gas distribution system (e.g., utility company), more scrubbing is required. Biogas that is produced accumulates in the headspace of the digester 242 before it is output from the digester 242. In some embodiments, the gas is first output to an optional, external auxiliary storage vessel (not shown). In some embodiments, biogas constituents are identified and quantified using a gas analyzer so the Btu of biogas delivered can be metered with a gas meter 248.

Any biogas produced that exceeds the storage capacity or collection capabilities of the system 216 is combusted in a flare device 252. The flare device 252 burns the excess gas (e.g., methane). The methane is converted to carbon dioxide and water before exhausting to the atmosphere, which is important because methane has more than 20× the greenhouse gas effect compared to $CO_2$.

The gases produced by the anaerobic digester 242 include predominantly methane gas with the balance being $CO_2$ gas and trace gases. Some moisture exists in the gas and this is typically removed with a condenser. If the concentration of $H_2S$, as a trace gas, is substantial (e.g., greater than about 1000 ppm) the $H_2S$ may be reduced. $H_2S$ will burn in a boiler or combustion engine, however, when it eventually is exhausted to ambient it will oxidize and produce $H_2SO_4$ (sulfuric acid), which is corrosive. Several methods exist that are well known to those skilled in the art to reduce the $H_2S$ concentration in the biogas. In some embodiments, the biogas scrub module 212 includes an activated carbon filtration system that sequesters the $H_2S$. In some embodiments, ferric chloride is introduced with the brewery byproducts to prevent $H_2S$ formation in the first place.

In this embodiment, a portion of the gas produced by the anaerobic digester 242 is used in a boiler 224. The boiler 224 burns the gas to produce heat 206 that is used by the anaerobic digester 242 in processing the brewery waste 280. It is desirable to control the temperature of the anaerobic digester 242 to optimize the metabolism of the anaerobic bacteria. A heat exchanger 220 receives heat from the boiler 224. The heat 206 from the boiler 224 heats liquid received from the anaerobic digester 242 and/or the solids separation module 228. The heated liquid 212 is then output from the heat exchanger 220 to the inlet 234 of the vessel 222 of the anaerobic digester 242. The heated liquid 212 is used in the anaerobic digestion processes that occur in the vessel 222 of the anaerobic digester 242. In some embodiments, the boiler 224 is a brewery boiler used in the brewery for other purposes (e.g., the beer brewing process or heating the facility). In some embodiments, the boiler 224 is a dedicated boiler used exclusively for the anaerobic digester system 216.

If the entirety of the biogas produced by the digester 242 is not consumed by the brewery processes and the boiler 224, then the excess gas can be sold to a gas utility for subsequent distribution to gas customers. Gas that is to be provided to a gas utility requires the moisture, $H_2S$ and $CO_2$ to be removed from the biogas. There are various technologies available for removing these substances from the gas which are well know to those skilled in the art. For example, skid mount units are commercially available that remove these substances from the biogas (e.g., the NEO-Gas™ plant sold by New Energy Solutions, Inc. of Pittsfield, Mass.). In some embodiments, the excess gas is converted to electricity using a generator set that consumers the excess gas, or heat and electricity using a cogeneration system. In some embodiments, the gas is compressed and stored. In some embodiments, the excess gas is combusted in the flare device 252.

Solids produced by the anaerobic digester 242 are pumped to the solids separation module 228. The anaerobic digester 242 pumps solids to the solids separation module 228 with pump 298. In one embodiment, the solids separation module 228 includes a screw press that wrings water from the solids and produces a soil amendment material 128 that is pumped to a solids loading vessel 256 via pump 260. The soil amendment material 128 is trucked offsite. The liquid that is wrung from the solids is pumped back to the anaerobic digester 242 using pump 240. In some embodiments, the liquid pumped by the pump 240 is mixed with the liquid that is circulated through the heat exchanger 220 and then into the inlet 234 of the vessel 222.

Figure 3:
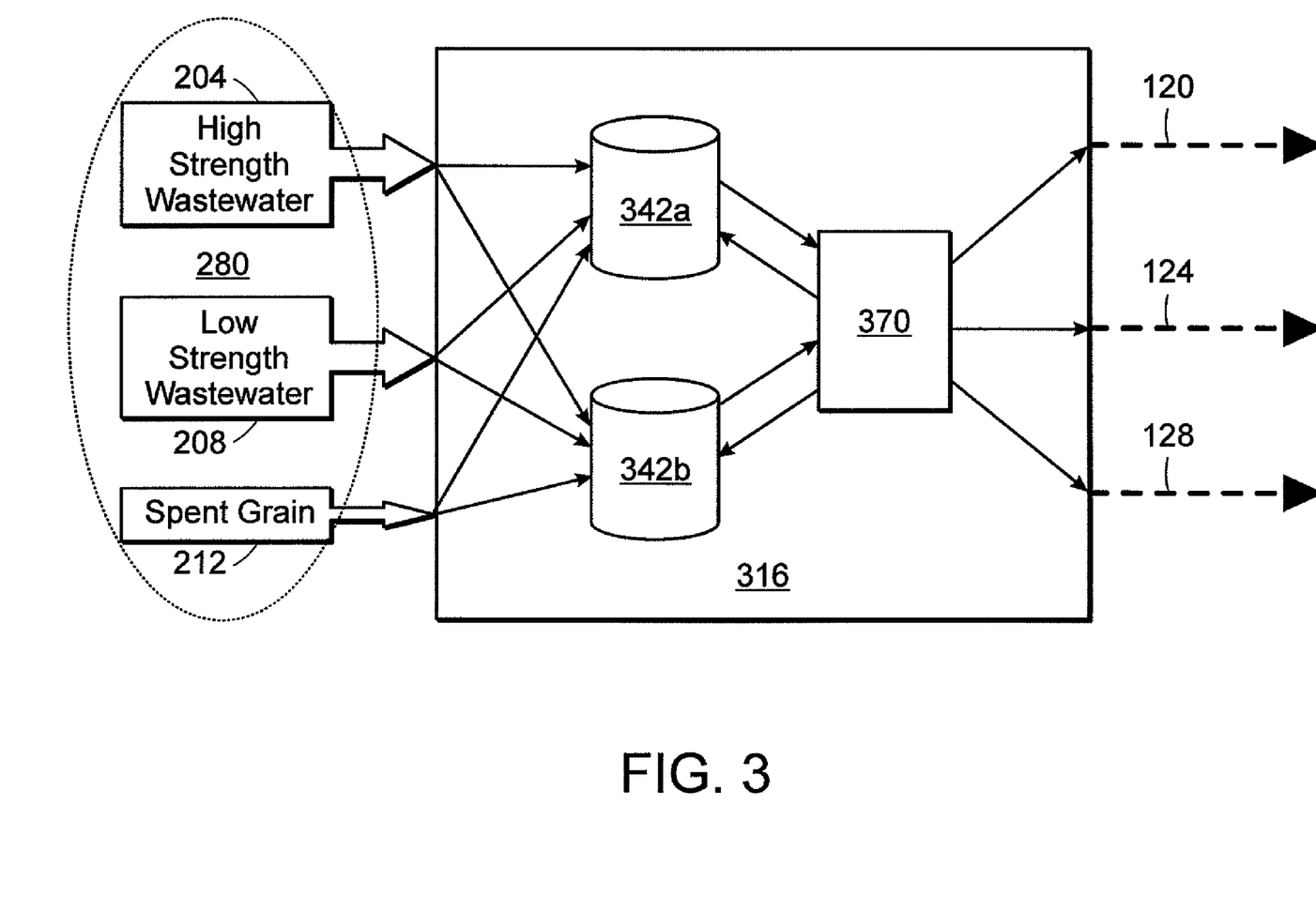
FIG. 3 is a schematic illustration of a system for processing brewery waste, according to an illustrative embodiment of the invention.

FIG. 3 is a schematic illustration of a system 316 for processing brewery waste 280, according to an illustrative embodiment of the invention. High strength (high COD) wastewater 204, low strength (low COD) wastewater 208 and organic waste solids 212 (e.g., spent grain or byproducts of cheese manufacturing processes) are provided to the system 316. The high strength wastewater 204, low strength wastewater 208 and organic waste solids 212 are processed by the system 316 to produce gases 120, liquids 124 and solids 128. The gases 120 typically include a mixture of methane, carbon dioxide and some trace gases. The liquids 124 produced are substantially clean of organic compounds and sometimes discharged for subsequent processing by a publicly owned treatment works (e.g., the publicly owned treatment works 244 of FIG. 2). The solids 128 can be used as, for example, soil amendment materials.

The system 316 includes multiple anaerobic digesters 342a and 342b (e.g., two of the three phase anaerobic digesters 232 of FIG. 2). Multiple anaerobic digesters may be advantageous for horizontal process scaling and for mitigating risk of anaerobic digester failure through redundancy. High strength wastewater 204, low strength wastewater 208 and waste solids 212 are provided to both of the anaerobic digesters 342a and 342b. The system 316 includes a set of processing equipment 370 that is coupled to the two anaerobic digesters 342a and 342b to facilitate the processing of the brewery waste 280. The processing equipment 370 includes the various components and modules (e.g., the components and modules of system 216 of FIG. 2) necessary to process the output of the anaerobic digesters 342a and 342b. For example, the processing equipment 370 includes one or more solids separation modules (e.g., solids separation module 228 of FIG. 2) to process the solids produced by the anaerobic digesters 342a and 342b. In addition, the processing equipment includes a liquid post treatment module (e.g., liquid post treatment module 264 of FIG. 2). In this manner, a single set of processing equipment can be used to process the outputs of the anaerobic digesters 342a and 342b.

Figure 4:
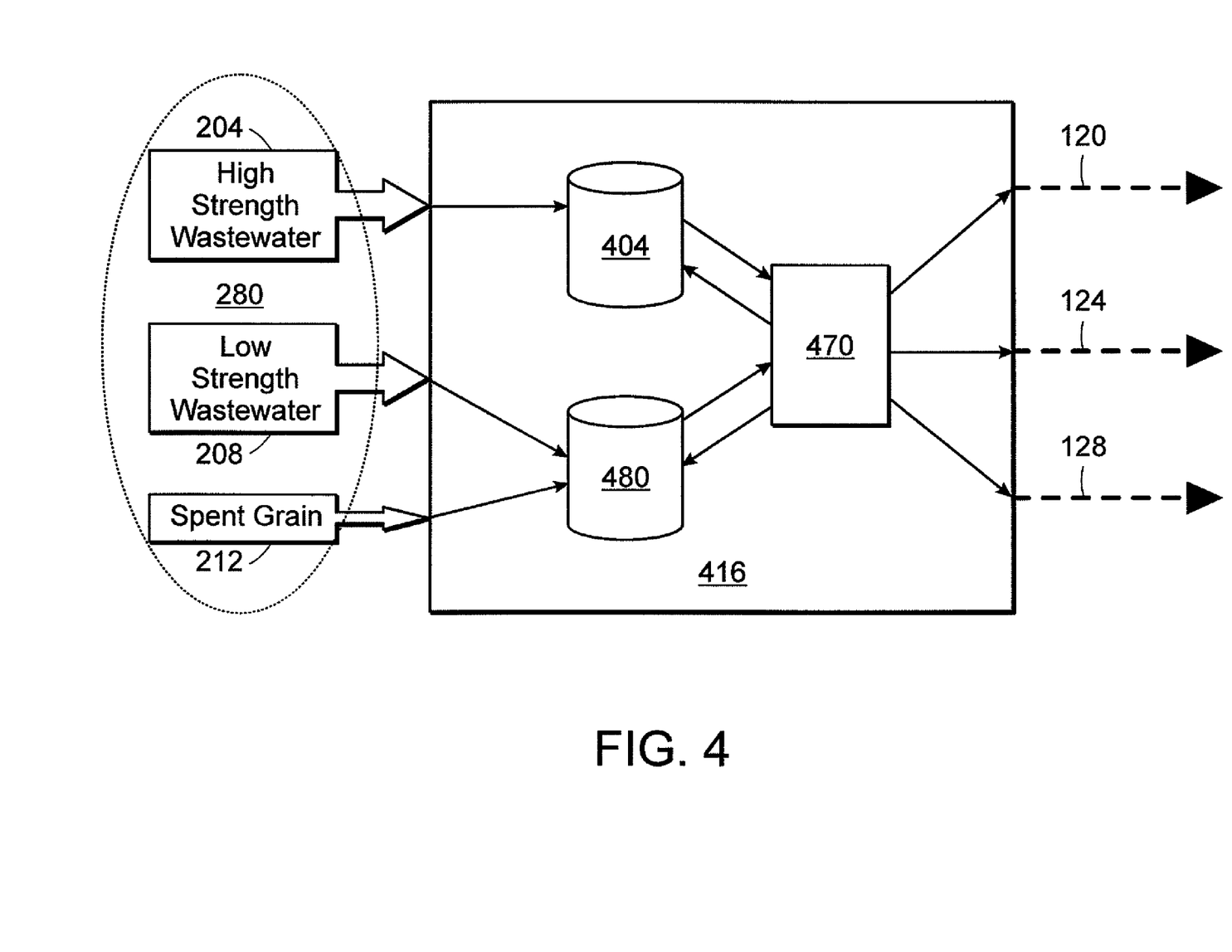
FIG. 4 is a schematic illustration of a system for processing brewery waste, according to an illustrative embodiment of the invention.

FIG. 4 is a schematic illustration of a system 416 for processing brewery waste 280, according to an illustrative embodiment of the invention. High strength wastewater 204, low strength wastewater 208 and organic waste solids 212 are provided to the system 416. The high strength wastewater 204, low strength wastewater 208 and organic waste solids 212 are processed by the system 416 to produce gases 120, liquids 124 and solids 128. The gases 120 typically include a mixture of methane, carbon dioxide and some trace gases.

The liquids 124 produced are substantially clean of organic compounds and sometimes discharged for subsequent processing by a publicly owned treatment works (e.g., the publicly owned treatment works 244 of FIG. 2). The solids 128 can be used as, for example, soil amendment materials.

The system 416 includes two anaerobic digesters 404 and 480. The anaerobic digester 404 is a two phase anaerobic digester. The first phase of the aerobic digester 404 includes an upflow anaerobic sludge blanket digester and the second phase includes a fixed-film anaerobic digester. The anaerobic digester 480 is a three phase anaerobic digester. The first phase of the anaerobic digester 480 includes a plug flow anaerobic digester, the second phase includes an upflow sludge blanket anaerobic digester, and the third phase includes a fixed-film anaerobic digester (e.g., the plug flow digester 284, the upflow anaerobic sludge blanket digester 288, and the fixed-film anaerobic digester 292 of the anaerobic digester 204 of FIG. 2).

High strength wastewater 204 is provided to the upflow anaerobic digester of anaerobic digester 404 to produce a first output. A portion (e.g., the liquid portion) of the first output is provided to the fixed-film anaerobic digester of the anaerobic digester 404 to produce a second output.

Low strength wastewater 208 and the spent grain 212 are provided to the plug flow anaerobic digester of anaerobic digester 480 to produce a third output. A portion (e.g., the liquid portion) of the third output is provided to the upflow anaerobic sludge blanket digester of the anaerobic digester 480 to produce a fourth output. A portion (e.g., the liquid portion) of the fourth output is provided to the fixed-film anaerobic digester to produce a fifth output.

The system 416 includes a set of processing equipment 470 that is coupled to the two anaerobic digesters 404 and 480 to facilitate the processing of the brewery waste 280. The processing equipment 470 includes the various components and modules (e.g., the components and modules of system 216 of FIG. 2) necessary to process the output of the anaerobic digesters 404 and 480. In this manner, a single set of processing equipment can be used to process the outputs of the anaerobic digesters 404 and 480.

In some embodiments, the liquids of at least one of the first, second, third, fourth or fifth outputs is treated (e.g., using the liquid post treatment module 264 of FIG. 2) to produce a low oxygen demand liquid (e.g., a low COD liquid). In some embodiments, the solids of at least one of the first, second, third, fourth or fifth outputs is treated (e.g., using the solids separation module 264 of FIG. 2) to produce a soil amendment material.

U.S. Pat. No. 6,982,035 describes various systems, components and processes for anaerobic digesters whose principles can be applied to the principles of the present invention and, the entire contents of which, are therefore hereby incorporated by reference.

Variations, modifications, and other implementations of what is described herein, including the use of multiple vessels, redundant vessels and/or other digester technologies, will occur to those of ordinary skill in the art without departing from the spirit and the scope of the invention and are considered to be encompassed thereby. Accordingly, the invention is not to be defined only by the preceding illustrative description.

What is claimed is:

1. A method for processing brewery waste, comprising:
   receiving spent grain, low strength wastewater and high strength wastewater;
   processing the spent grain, low strength wastewater and high strength wastewater with a plug flow anaerobic digester to produce a first output;
   processing a portion of the first output with an upflow anaerobic sludge blanket digester to produce a second output; and
   processing a portion of the second output with a fixed-film anaerobic digester to produce a third output.

2. The method of claim 1, comprising mixing the spent grain, low strength wastewater and high strength wastewater prior to providing the spent grain, low strength wastewater and high strength wastewater to the plug flow digester.

3. The method of claim 1, wherein the first output comprises gases, liquids and solids.

4. The method of claim 1, wherein liquids of the first output are the portion of the first output processed with the upflow anaerobic sludge blanket digester.

5. The method of claim 1, wherein the second output comprises gases, liquids and solids.

6. The method of claim 1, wherein liquids of the second output are the portion of the second output processed with the fixed-film anaerobic digester.

7. The method of claim 1, wherein the third output comprises gases, liquids and solids.

8. The method of claim 1, comprising recirculating a portion of liquids of the third output to the plug flow anaerobic digester.

9. The method of claim 1, comprising treating liquids of the third output to produce a low oxygen demand liquid.

10. The method of claim 1, comprising treating solids of the first and second outputs to produce a soil amendment material.

11. The method of claim 1, comprising collecting gases of the first, second and third outputs.

12. The method of claim 11, wherein the collected gases comprise methane.

13. The method of claim 12, wherein a portion of the methane is burned in a boiler to provide heat to the plug flow anaerobic digester, upflow anaerobic sludge blanket digester and fixed-film anaerobic digester.

14. A method for processing brewery waste, comprising:
   receiving spent grain, low strength wastewater and high strength wastewater;
   processing the high strength wastewater with an upflow anaerobic sludge blanket digester to produce a first output;
   processing a portion of the first output with a fixed-film anaerobic digester to produce a second output;
   processing the spent grain and low strength wastewater with a plug flow anaerobic digester to produce a third output;
   processing a portion of the third output with an upflow anaerobic sludge blanket digester to produce a fourth output; and
   processing a portion of the fourth output with a fixed-film anaerobic digester to produce a fifth output.

15. The method of claim 14, comprising treating liquids of at least one of the first, second, third, fourth or fifth outputs to produce a low oxygen demand liquid.

16. The method of claim 14, comprising treating solids of at least one of the first, second, third, fourth or fifth outputs to produce a soil amendment material.

17. A three-stage anaerobic digestion system for processing brewery waste, comprising:
   at least one inlet for receiving at least one of spent grain, low strength wastewater or high strength wastewater;

a plug flow anaerobic digester coupled to the at least one inlet for processing the at least one of spent grain, low strength wastewater or high strength wastewater to produce a first output;

an upflow anaerobic sludge blanket digester coupled to an outlet of the plug flow digester for processing the first output to produce a second output; and a fixed-film anaerobic digester coupled to an outlet of the upflow anaerobic sludge blanket digester for processing the second output to produce a third output comprising solids, liquids and gases.

18. The system of claim 17, wherein the plug flow anaerobic digester, upflow anaerobic sludge blanket digester and fixed-film anaerobic digester are integrated into a single digester structure.

19. A method for processing brewery waste, comprising:

receiving spent grain, low strength wastewater and high strength wastewater;

processing the low strength wastewater and the high strength wastewater with an upflow anaerobic sludge blanket digester to produce a first output;

processing a portion of the first output with a fixed-film anaerobic digester to produce a second output;

processing the spent grain with a plug flow anaerobic digester to produce a third output;

processing a portion of the third output with an upflow anaerobic sludge blanket digester to produce a fourth output; and processing a portion of the fourth output with a fixed-film anaerobic digester to produce a fifth output.

20. A method for processing brewery waste, comprising:

receiving spent grain, low strength wastewater and high strength wastewater;

processing the low strength wastewater with an upflow anaerobic sludge blanket digester to produce a first output;

processing a portion of the first output with a fixed-film anaerobic digester to produce a second output;

processing the spent grain and the high strength wastewater with a plug flow anaerobic digester to produce a third output;

processing a portion of the third output with an upflow anaerobic sludge blanket digester to produce a fourth output; and processing a portion of the fourth output with a fixed-film anaerobic digester to produce a fifth output.

21. A method for processing organic waste, comprising:

receiving organic waste solids, low strength wastewater and high strength wastewater;

processing the organic waste solids, low strength wastewater and high strength wastewater with a plug flow anaerobic digester to produce a first output;

processing a portion of the first output with an upflow anaerobic sludge blanket digester to produce a second output; and processing a portion of the second output with a fixed-film anaerobic digester to produce a third output.

\* \* \* \* \*